United States Patent [19]

Darwin et al.

[11] 4,021,964
[45] May 10, 1977

[54] HYDROPONIC SYSTEM CONVERTIBLE TO AN OPEN OR CLOSED SYSTEM

[75] Inventors: William B. Darwin; Joseph Michael Livengood, both of Conroe, Tex.

[73] Assignee: William B. Darwin

[22] Filed: Feb. 11, 1976

[21] Appl. No.: 657,153

[52] U.S. Cl. .................................. 47/62; 47/80
[51] Int. Cl.² .................................. A01G 31/00
[58] Field of Search ........... 47/1.2, 17, 38.1, 38.10, 47/38, 58; 119/5

[56] References Cited

UNITED STATES PATENTS

| | | | |
|---|---|---|---|
| 1,992,878 | 2/1935 | Muller | 47/1.2 |
| 2,188,875 | 1/1940 | Ellis | 47/38.1 X |
| 2,336,755 | 12/1943 | Sejarto | 47/34.13 |
| 2,674,828 | 4/1954 | Tegner | 47/38.1 X |
| 2,855,725 | 10/1958 | Carothers | 47/17 |
| 3,292,584 | 12/1966 | Brodrick | 47/1.2 X |
| 3,768,201 | 10/1973 | Yoo | 47/1.2 X |
| 3,916,565 | 11/1975 | Runyon | 47/1.2 |

FOREIGN PATENTS OR APPLICATIONS

| | | | |
|---|---|---|---|
| 24,939 | 10/1935 | Australia | 47/1.2 |
| 1,141,377 | 9/1957 | France | 47/1.2 |
| 34,642 | 7/1912 | Sweden | 47/38.1 X |

OTHER PUBLICATIONS

"Secrets of Successful Tank Farming," Popular Science Monthly, vol. 134, No. 4, Apr. 1939, pp. 144–147.

Primary Examiner—E. H. Eickholt
Attorney, Agent, or Firm—Pravel, Wilson & Gambrell

[57] ABSTRACT

A new and improved hydroponic system including a plant supporting chamber having an inert, supportive medium therein; a collection reservoir positioned below the plant supporting chamber; a pump reservoir for containing a nutrient solution and delivering the nutrient solution to the plant supporting chamber and first and second valve means for operating the hydroponic system as either a closed or an open hydroponic system as desired.

6 Claims, 3 Drawing Figures

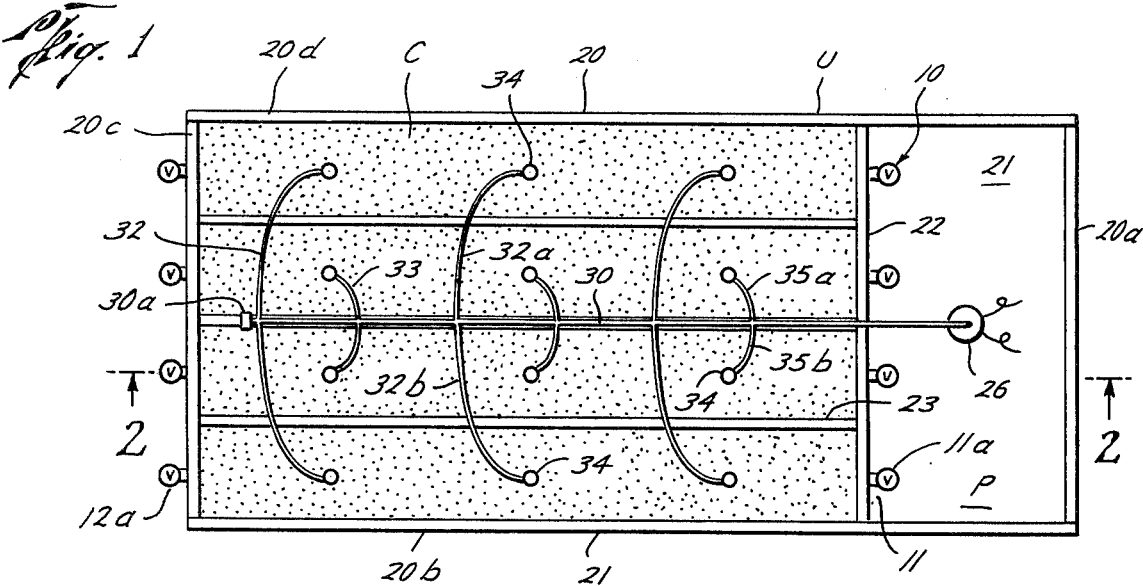
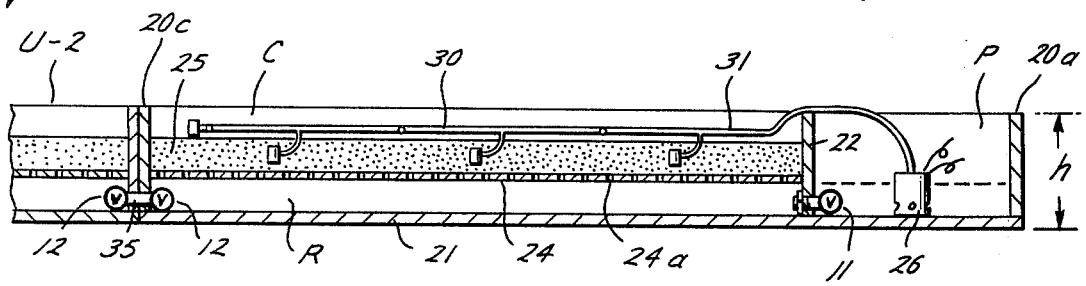
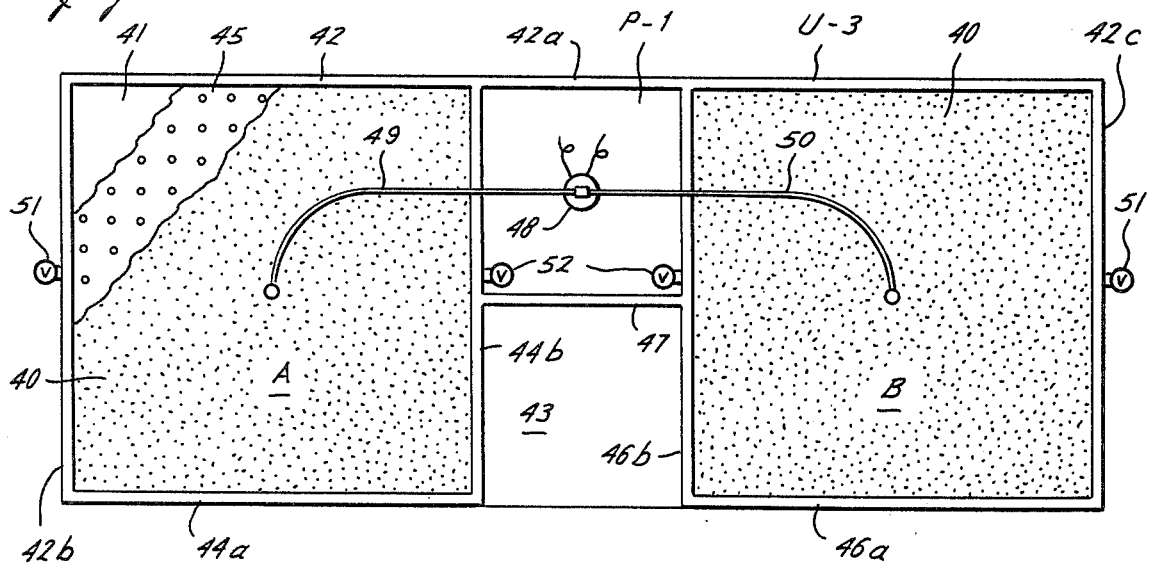

HYDROPONIC SYSTEM CONVERTIBLE TO AN OPEN OR CLOSED SYSTEM

BACKGROUND OF THE INVENTION

The field of this invention is hydroponic gardening.

Hydroponic gardening relates to the growth of plants for aesthetic appeal and/or for food production without the use of soil. Hydroponic gardening probably first became a reality around 1940 when the U.S. Army utilized hydroponic gardening techniques to grow fresh vegetables in the Pacific Islands. However, there are even earlier patents to hydroponic gardening. U.S. Pat. Nos. 2,241,699 issued to Cooper and 2,188,875 issued to Ellis are examples of very early attempts to utilize hydroponic theories in a practical unit.

There are basically two types of hydroponic systems: an open system and a closed system. In the open hydroponic system, a nutrient solution is periodically fed to the plants as supported in an inorganic medium. The nutrient solution is drained through the inorganic medium to the environment. In the closed hydroponic system, the nutrient solution periodically fed to the plant supported in an inorganic medium is collected and recirculated for further use in later periodic feeding cycles. "Hydroponics — Toward Perfect Gardening", *Houston Home and Garden*, September, 1975, pp. 63–69.

Recently, the interest in hydroponic gardening has substantially increased. The reasons for this are probably several and very important. First of all, some of the major countries of the world continue to have problems producing food under typical conditions — either because of poor weather or poor soil or both. Secondly, in very populated areas such as the United States, the availability of land for gardens for the average homeowner is rapidly decreasing. Hydroponic gardening techniques offer the possibility of home grown food products to the townhouse apartment owner, or the owner of a small home on a small tract who cannot otherwise have a garden. Adding fuel to the burgeoning need for hydroponic gardening is the rising cost of food products.

There are presently various patents in addition to the two already mentioned that disclosed hydroponic gardening systems. For example, U.S. Pat. Nos. 2,952,096, 2,983,076, 3,323,253 and 3,451,162 are directed to closed systems. The previously mentioned patent to Ellis '875 discloses a central plant propagating compartment having mounted above it a trough for distributing nutrients and having mounted below it and at one side a nutrient solution pump. The Ellis patent device includes a rubber bulb connected to tubes which extend from the nutrient solution sump to the nutrient solution trough for the purpose of recirculating the nutrient solution. Thus the Ellis system is a closed system because the nutrient solution is circulated in order to make periodic feedings. The Cooper patent '699 also discloses a hydroponic unit which is a form of a closed system wherein the nutrient solution is fed from a lower compartment into the upper, plant supporting compartment for the purposes of feeding the plants. The nutrient then drains back downwardly into the lower compartment for re-use. The device disclosed in Cooper cannot be converted into an open system.

SUMMARY OF THE INVENTION

This invention is directed to a new and improved hydroponic system which may be used as either an open system or a closed system. The new and improved hydroponic system includes a plant supporting chamber having a supporting medium for supporting plants for growth. A collection reservoir is positioned below the plant supporting chamber for receiving a nutrient solution after it passes through the supporting medium in the plant supporting chamber. A pump reservoir is positioned adjacent to the plant supporting chamber and to the collection reservoir for containing the nutrient solution and a pumping means is mounted in the pump reservoir for pumping the nutrient solution contained in the pump reservoir into the plant supporting chamber. Typically, in hydroponic gardening, the distribution of the nutrient solution occurs on a regular, periodic basis.

In the preferred embodiment of this invention, the convertible hydroponic system includes conversion means for converting the hydroponic system from a closed system to an open system. The hydroponic system is utilized as a closed system when the nutrient solution is recirculated from the collection reservoir to the pump reservoir; and, the hydroponic system is utilized as an open system when the nutrient solution is drained outwardly of the collection reservoir to the environment. This description of the invention is intended as a summary only. The scope of the protection sought and received is set forth in the claims.

BRIEF DESCRIPTION OF THE DRAWINGS

FIG. 1 is a top view of the new and improved convertible hydroponic system of the preferred embodiment of this invention;

FIG. 2 is a side view in section taken along line 2—2 of FIG. 1 illustrating the convertible hydroponic system and in addition, illustrating means for adding a second unit to the system; and FIG. 3 is a top view partly in section of an alternate embodiment of the convertible hydroponic system of this invention.

DESCRIPTION OF THE PREFERRED EMBODIMENT

Referring to the drawings FIG. 1 discloses a hydroponic unit U which is compact, easy and inexpensive to assemble, and convertible for operation as either a closed or open system. The improved hydroponic unit U includes a plant supporting chamber C, a collection reservoir R positioned below the plant supporting chamber and a pump reservoir P positioned adjacent to the collection reservoir R and the plant supporting chamber C. Conversion means generally designated by the number 10 are mounted with the collection reservoir R and with the pump reservoir P for converting the hydroponic unit U to either an open system or a closed system. The conversion means 10 includes a first valve means 11 positioned between the collection reservoir R and the pump reservoir P for fluid communication between the collection reservoir R and the pump reservoir P in order to operate the unit U as a closed system. In order to operate the unit U as an open system, the first valve means 11 prevents fluid communication between the collection reservoir R and the pump reservoir P and a second valve means 12 provides for drainage of nutrient from the plant supporting chamber C to the ground or other environment such that the nutrient solution is not passed through plants supported in the chamber C again.

A housing 20 provides the structure to form the plant supporting chamber C, collection reservoir R and pump reservoir P. The housing 20 is generally rectangular in configuration as viewed from the top and includes four upstanding walls 20a, 20b, 20c, and 20d which may be made of wood or other similar material and may be joined by any suitable and well known means. A bottom 21 of wood or other material is mounted onto the underside of the four upstanding walls 20a–20d.

An upstanding partition 22 is attached to and extends between the side walls 20b and 20d in a direction parallel to the end wall 20a and spaced therefrom. The pump reservoir P is formed by the bottom 21, partition 22, and wall 20a and portions of the side walls 20b and 20d. A suitable top (not shown) may be mounted onto the top of the pump reservoir P.

Several supports 23 extend between the partition 22 and end wall 20c parallel to side walls 20b and 20d. The supports 23 support a panel 24 having openings 24a therein in a plane parallel with the bottom 21. The panel 24 cooperates with the upper portions of the partition 22 and walls 20b–20d to form the plant supportive chamber C. A substantially inert, inorganic plant supporting medium 25 is positioned within the chamber C for supporting the root systems of the plants to be grown therein. The medium 25 may be any suitable substantially inert and/or inorganic material which is capable of providing support for the plant. Such support mediums 25 are known in the hydroponic field.

The collection reservoir R is formed by the unit bottom 21, lower portions of walls 20b–20d, lower portion of the partition 22 and the panel 24 having openings 24a. The purpose of the collection reservoir R is to receive and collect nutrient solution which has been pumped into the plant supporting chamber C from the pump reservoir P.

The nutrient solution is contained initially at least in the pump reservoir P. The scored line in the pump reservoir P in FIG. 2 indicates the presence of such fluid. A submersible pump 26 is mounted in the pump reservoir P. The subermisble pump may be of any suitable variety which is capable of low pressure pumping of a hydroponic nutrient solution. For example, the pump may be a submersible pump manufactured by Little Giant Pump Company of Oklahoma City, Okla., type No. IP553.

A distribution network 30 extends from the pump 26 over the medium 25 in the plant supporting chamber C. The distribution network 30 includes a main distribution line 31 which is attached to the pump and extends over the partition 22 and runs substantially the length of the chamber C at approximately the middle thereof. The main line 31 is capped at end 30a. Lateral distribution line sets 32 and 33 are positioned alternately along the main line 30 for distributing nutrient solution from pump 26 over plants positioned in various areas in the plant supporting medium 25 in chamber C.

Each set 32 of distribution lines include first and second lines or tubes connected to the main line 31 and extending outwardly near to the upstanding side walls 20b and 20c for distributing nutrient solution near to the walls. Each of the lines 32a and 32b terminate in a hollow sleeve or cap 33. The lines 32a and 32b are actually connected into and terminate in a wall of the hollow, cylindrical cap 33 for spraying the fluid against the inside walls of the cap. Impacting of the pumped fluid against the cap 33 dissipates the force of the fluid due to pumping pressures and thus allows the fluid to gently drip into the plant supporting medium 34. Each set 33 of lateral lines include smaller lines or tubes 35a and 35b which also terminate in dissipating caps 34. The lengths of the lines 35a–35b are substantially less than the lines 32a–33b for the purpose of distributing fluid in the regions newer to the main line 38. The combination of the lateral line sets 32 and 33 provide for even, spatial distribution of the nutrient solution directed from the pump P.

The nutrient solution is actually delivered into the plant supporting chamber C on a periodic basis. Such periodic feeding of the nutrient solution may be accomplished by manual activation of the pump P or by automatic activation by the utilization of suitable timing system such as known in the art. Since the periodic feeding procedures do not form part of this invention, it will not be discussed further.

The first valve means 11 involves a series of valves 11a which may be of any suitable variety which are capable of providing fluid communication between the pump reservoir P and the collection reservoir R. The valves 11a are located in the partition 22 below the level of the panel 24. The actual number of valves 11a will be dependent upon the size of the reservoirs R and P and other parameters known in the art.

The second valve means 12 consists of a series of valves 12a located in the end wall 20c below the panel 24 for providing or preventing drainage from the collection reservoir R. The valve means 11 and 12 cooperate with the chamber C and reservoirs R and P to make the hydroponic unit U convertible for operation as either a closed hydroponic system or an open hydroponic system.

When the unit U is operated as a closed system, the valves 12a, which may be of any suitable variety just as the valves 11a, are closed and the valves 11a are open. In this manner, nutrient pumped from the pump 26 in the pump reservoir P through the network 30 is allowed to drain through openings 24a into the collection reservoir R. The valves 11a, being open, allow for the collected nutrient solution to flow back into the pump reservoir P for mixing with the solution already in the pump reservoir P and thus recycled or recirculated. In this manner, the valves 11a and 12a are utilized to allow the unit U to operate as a closed system.

In order to operate the unit U as an open system, the valves 11a are closed and the valves 12a are opened, thus allowing the nutrient solution to drain through openings 24a through reservoir R and valves 12a to the ground or other part of the environment. This is a uniquely desirable feature heretofore known in the art. The ability to utilize the system as either a closed or an open system provides the user with great flexibility. For example, the user may utilize the unit U as a closed system within his house or other structure during one part of the year and then may move the unit U outside for use as an open system during another part of the year.

The valve means 11 and 12 also allow the unit U to be operated in conjunction with other units U as a system. Referring to FIG. 2, a second unit U-2 identical to the unit U may be attached to the unit U to operate as a combined, closed or open system. The same numbers and letters will be used to describe the elements of U-2 since they are identical to those of U. Unit U-2, only partly shown, includes a second valve means 12 which is connected to the valve means 12 of U through a suitable line in order to operate the unit U and U-2 as a closed system. In order to operate the units U and U-2 as a closed system, the distribution network 30 for the unit U is connected to the distribution network (not shown) for the unit U-2. Thus, nutrient from the common pump reservoir P may be distributed over the plant supporting chambers C for both units and the fluid draining therethrough may be collected in the respective reservoirs R and transferred back through valves 12a of U and U-2 to the common pump reservoir P of unit U for re-use. In this manner, multiple units may provide a combination closed system. The units U and U-2 may be utilized as a combination open system by opening the second valve means 12 of U-2 and the second valve means 12 of U so that all fluid pumped from the common reservoir P is drained into the environment.

An alternate embodiment U-3 of the hydroponic unit U is illustrated in FIG. 3. The hydroponic unit U-3 includes a pump reservoir P which is positioned adjacent to two combination plant support chambers and collection reservoirs designated by the letters A and B. The chamber-reservoir combination A includes an upper, plant supporting chamber 40 positioned above a collection reservoir 41. The combination chamber-reservoir B is identical and includes a plant supporting chamber 40 positioned above a collection reservoir 41.

The housing 42 of the unit U-3 is basically rectangular in configuration and includes upstanding wall portions 42a, 42b, and 42c. A bottom 43 is attached and extends between these three upstanding walls. The combination chamber-reservoir A is formed by a part of the upstanding wall 42a, the wall 42b, and in addition by upstanding walls 44a and 44b. A drain panel 45 is positioned by suitable supports (similar to supports 23 of U) to form the plant supporting chamber 40 and the collection reservoir 41 of A.

Similarly, the combination chamber-reservoir B is formed by a part of upstanding wall portion 42a, wall 42c and in addition by upstanding walls 46a and 46b which are interconnected in a generally square configuration as illustrated in FIG. 3. A suitable drain panel (not shown) identical to the drain panel 45 is properly positioned to provide the pump supporting chamber 40 and collection reservoir 41. A partition 47 is spaced from the wall 42a and extends between the walls 44b and 46b to provide the pump reservoir P-1. A submersible pump 48 identical to the pump 26 is positioned therein and distribution networks 49 and 50 extend outwardly therefrom over the plant support medium 40 for the chamber-reservoir combinations A and B.

Each of the chamber-reservoir combinations A and B have a valve 51 positioned on one of the outside walls, 42b and 42c, respectively. Further, valves 52 are located in the walls 44b and 46b of the chamber-reservoir combinations A and B, respectively. With the valves 51 closed and the valve 52 open, the unit U-3 acts as a closed system thus recirculating the nutrient solution back to the common pump reservoir P-1 for periodic feedings. Should it be desirable to operate the unit U-3 as an open system, the valves 52 are closed and the valves 51 are open in order to allow the solution drained into the collection reservoirs 41 of the chamber-reservoir combinations A and B to drain outwardly to the ground or other environment. In this matter the unit U-3 is convertible from an open to a closed system just as the unit U is convertible. It is further within the scope of this invention to add additional units V-3 to the unit U-3 illustrated in FIG. 3 by making proper connections between the respective valves 51.

The foregoing disclosure and description of the invention are illustrative and explanatory thereof, and various changes in the size, shape, and materials as well as in the details of the illustrated construction may be made without departing from the spirit of the invention.

We claim:
1. An improved hydroponic system for growing plants in a supportive medium by periodic feeding of such plants with a nutrient solution, comprising:
   a rectangular housing forming a plant supporting chamber, collection reservoir and pump reservoir, said rectangular housing being formed by first, second, third and fourth upstanding walls having a common bottom, said second and fourth walls being side walls and said first and third wall being end walls;
   an upstanding partition extending between said second and fourth, oppositely positioned side walls;
   a horizontal panel having openings therein extending from said upstanding partition to said second, third and fourth walls and being vertically spaced from said bottom to form a collection reservoir below said panel and a plant supporting chamber above said panel, said panel allowing drainage of fluid from said plant supporting medium to said collection reservoir, said plant supporting chamber having a supportive medium for supporting plants;
   said first, second and fourth walls and said bottom cooperating to form said pump reservoir for containing a nutrient solution and pump means for pumping said nutrient solution contained in said pump reservoir into said plant supporting chamber through a fluid distribution line;
   conversion means mounted with said collection reservoir and pump reservoir for converting said system into either a closed or open hydroponic system, said conversion means including:
   first valve means positioned in said upstanding partition below said horizontal panel between said pump reservoir and collection reservoir for providing fluid communication therebetween to operate said hydroponic system as a closed system in which a nutrient solution is circulated from said pump reservoir to said plant supporting chamber and drained into said collection reservoir in fluid communication with said pump reservoir;
   said first valve means preventing fluid communication between said collection reservoir and said pump reservoir to cooperate with a second valve means to operate said hydroponic system as an open system; and
   said second valve means for providing drainage to atmosphere of said nutrient solution after passage through said support medium of said collection reservoir to operate said hydroponic system as an open system.

2. The structure set forth in claim 1, including:
   a second plant supporting chamber positioned adjacent to said pump reservoir on the opposite side from said first-mentioned plant supporting reservoir;

a second fluid distribution line connected to said pump means and extending to said second plant supporting chamber for supplying nutrient solution simultaneously to both said first-mentioned and said second plant supporting chambers; and a second collection reservoir positioned below said second plant supporting chamber.

3. The structure set forth in claim 2, including:

third valve means positioned between said pump reservoir and said second collection reservoir for providing fluid communication between said second collection reservoir and said pump reservoir to cooperate with said first valve means to operate said hydroponic system as a closed system in which said nutrient solution is circulated from said pump reservoir to said first-mentioned and said second plant supporting chambers and drained therefrom into said first-mentioned and said second collection reservoirs in fluid communication with said pump reservoir for recirculation of said nutrient solution.

4. The structure set forth in claim 3, including:

said third valve means preventing fluid communication between said second collection reservoir and said pump reservoir to cooperate with said second valve means and with a fourth valve means to operate said hydroponic system as an open system; and said fourth valve means for preventing drainage of said collection reservoir to operate said hydroponic system as a closed system and for providing drainage to the environment of said nutrient solution from said second collection reservoir to cooperate with said second valve means to operate said hydroponic system as an open system.

5. The structure set forth in claim 1, including:

said first-mentioned plant supporting chamber, collection reservoir, pump reservoir, distribution line, first valve means and second valve means forming a first convertible hydroponic unit; and a second hydroponic unit being substantially identical to said first hydroponic unit and including a second plant supporting chamber, a second collection reservoir, a second distribution line and third and fourth valve means for connecting to said first hydroponic unit second valve means, said first and second hydroponic units utilizing said first unit pump means and said first unit pump reservoir and collection reservoirs in fluid communication with said second collection reservoir to operate as a combined closed system.

6. The structure set forth in claim 1, including:

said second valve means being mounted in one of said second, third and fourth walls forming part of said collection chamber.

* * * * *